(12) United States Patent
Chen et al.

(10) Patent No.: US 11,889,079 B2
(45) Date of Patent: *Jan. 30, 2024

(54) CONSTRAINED PREDICTION MODE FOR VIDEO CODING

(71) Applicant: Huawei Technologies Co., Ltd., Shenzhen (CN)

(72) Inventors: Jianle Chen, San Diego, CA (US); Yin Zhao, Hangzhou (CN); Semih Esenlik, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/171,596

(22) Filed: Feb. 20, 2023

(65) Prior Publication Data

US 2023/0209053 A1 Jun. 29, 2023

Related U.S. Application Data

(63) Continuation of application No. 17/318,071, filed on May 12, 2021, now Pat. No. 11,589,048, which is a
(Continued)

(51) Int. Cl.
*H04N 19/119* (2014.01)
*H04N 19/132* (2014.01)
(Continued)

(52) U.S. Cl.
CPC ......... *H04N 19/119* (2014.11); *H04N 19/132* (2014.11); *H04N 19/159* (2014.11);
(Continued)

(58) Field of Classification Search
None
See application file for complete search history.

(56) References Cited

U.S. PATENT DOCUMENTS 11,589,048 B2 * 2/2023 Chen .................... H04N 19/103
2014/0355679 A1 12/2014 Rosewarne
(Continued)

FOREIGN PATENT DOCUMENTS

| CN | 104104947 A | 10/2014 |
| CN | 106961606 A | 7/2017 |

(Continued)

OTHER PUBLICATIONS

"Line Transmission of Non-Telephone Signals Video Codec for Audiovisual Services AT p x 64 kbits," ITU-T Recommendation H.261, Mar. 1993, 29 pages.
(Continued)

*Primary Examiner* — Kaitlin A Retallick
(74) *Attorney, Agent, or Firm* — Conley Rose, P.C.

(57) ABSTRACT

A method of decoding a coded video bitstream implemented by a video decoder. The method includes determining a split mode for a coding tree unit (CTU) in an encoded bitstream, where the split mode is one of triple tree (TT), vertical binary tree (BT), and horizontal BT; marking a coding unit (CU) from the CTU as not to be predicted by intra prediction when one of three conditions is met; parsing the encoded bitstream to obtain a prediction unit and residual information for the CU from the CTU; and reconstructing the CU based on the prediction unit and the residual information when the CU has been marked.

16 Claims, 8 Drawing Sheets

Related U.S. Application Data continuation of application No. PCT/US2019/065015, filed on Dec. 6, 2019.

(60) Provisional application No. 62/785,208, filed on Dec. 26, 2018, provisional application No. 62/776,868, filed on Dec. 7, 2018.

(51) Int. Cl.

| | |
|---|---|
| *H04N 19/159* | (2014.01) |
| *H04N 19/176* | (2014.01) |
| *H04N 19/169* | (2014.01) |
| *H04N 19/46* | (2014.01) |
| *H04N 19/96* | (2014.01) |

(52) U.S. Cl.
CPC ....... *H04N 19/176* (2014.11); *H04N 19/1883* (2014.11); *H04N 19/46* (2014.11); *H04N 19/96* (2014.11)

(56) References Cited

U.S. PATENT DOCUMENTS

| | | | |
|---|---|---|---|
| 2016/0373770 A1 | 12/2016 | Zhao et al. | |
| 2017/0280162 A1 | 9/2017 | Zhao et al. | |
| 2018/0103268 A1 | 4/2018 | Huang et al. | |
| 2018/0199072 A1 | 7/2018 | Li et al. | |
| 2019/0075328 A1 | 3/2019 | Huang et al. | |
| 2020/0322602 A1* | 10/2020 | Huang | H04N 19/186 |

FOREIGN PATENT DOCUMENTS

| | | |
|---|---|---|
| CN | 107743705 A | 2/2018 |
| CN | 107948661 A | 4/2018 |
| CN | 108464006 A | 8/2018 |
| WO | 2018142903 A1 | 8/2018 |

OTHER PUBLICATIONS

"Transmission of Non-Telephone Signals; Information Technology—Generic Coding of Moving Pictures and Associated Audio Information: Video," ITU-T Recommendation H.262, Jul. 1995, 211 pages.

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services—Coding of moving video; High efficiency video coding" Recommendation ITU-T H.265, Apr. 2013, 317 pages.

Document: JVET-D0117r1, "Multi-Type-Tree," Joint Video Exploration Team (JVET) of ITU-T SG 16 WP 3 and ISO/IEC JTC 1/SC 29/WG 11, 4th Meeting: Chengdu, CN, Oct. 15-21, 2016, 3 pages.

Document: JVET-L1001-v1, "Versatile Video Coding (Draft 3)," Joint Video Experts Team (JVET) of ITU-T SG 16 WP 3 and ISO/IEC JTC 1/SC 29/WG 11, 12th Meeting: Macao, CN, Oct. 3-12, 2018, 169 pages.

\* cited by examiner

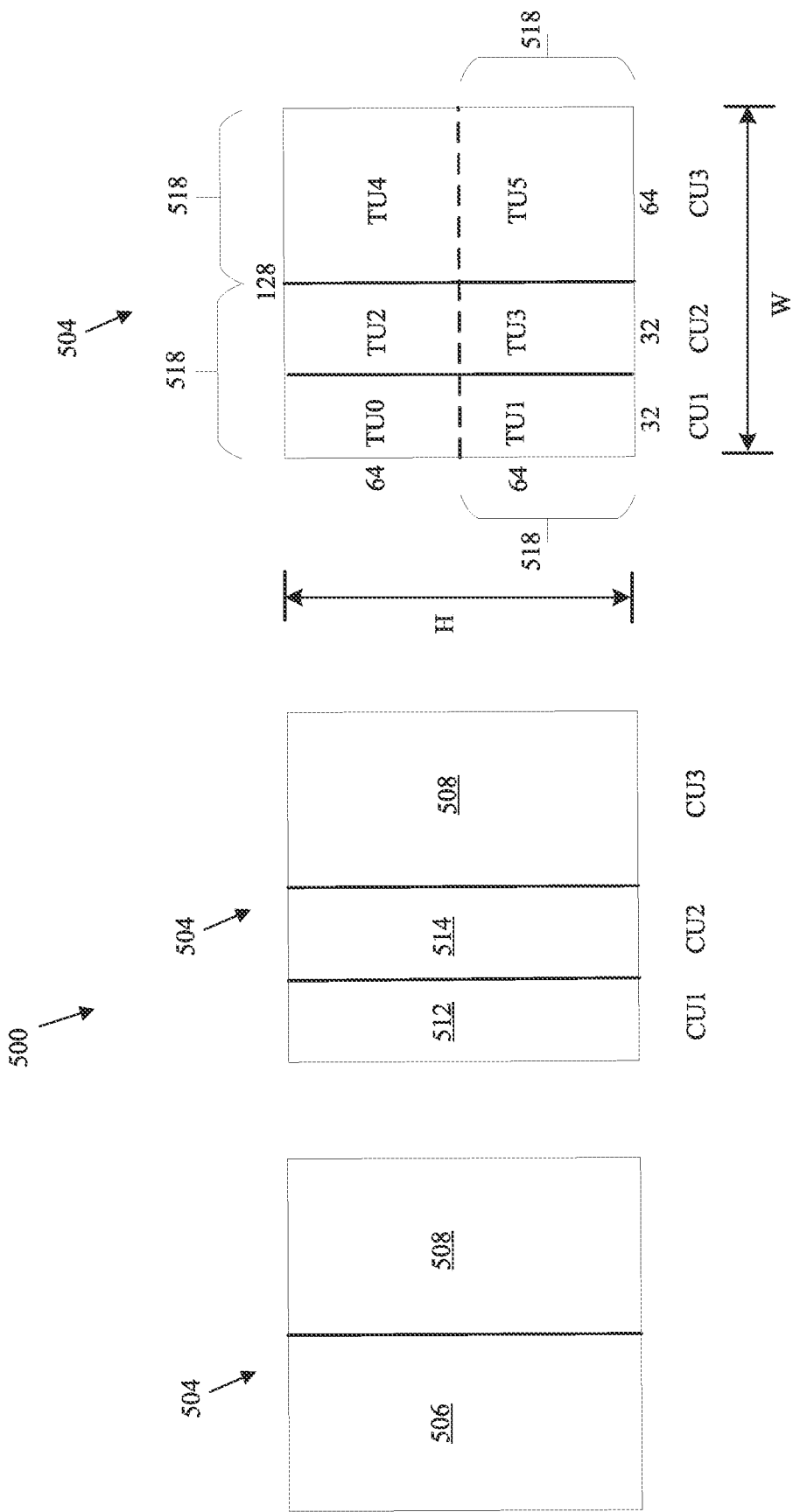

CONSTRAINED PREDICTION MODE FOR VIDEO CODING

CROSS-REFERENCE TO RELATED APPLICATIONS

This application is a continuation of U.S. patent application Ser. No. 17/318,071 filed on May 12, 2021, by Huawei Technologies Co., Ltd., and titled "Constrained Prediction Mode for Video Coding," which is a continuation of International Application No. PCT/US2019/065015 filed on Dec. 6, 2019, by Futurewei Technologies, Inc., and titled "Constrained Prediction Mode for Video Coding," which claims the benefit of U.S. Provisional Patent Application No. 62/785,208, filed Dec. 26, 2018, by Jianle Chen, et al., and titled "Decoding Method, Device and Apparatus," and U.S. Provisional Patent Application No. 62/776,868, filed Dec. 7, 2018, by Jianle Chen, et al., and titled "Constrained Prediction Mode for Video Coding," each of which is hereby incorporated by reference.

TECHNICAL FIELD

In general, this disclosure describes techniques for video compression in video coding. More specifically, this disclosure describes techniques that solve an intra-prediction reference sample dependency problem under an S×S pipeline block structure.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of encoding a video bitstream implemented by a video encoder, the method comprising splitting, by the video encoder, a coding tree unit (CTU) into at least one coding unit (CU) using a split mode, wherein the split mode is one of triple tree (TT), vertical binary tree (BT), and horizontal BT; marking, by the video encoder, the CU as not to be predicted by intra prediction when: the split mode of the CTU is TT and a width of the CTU or a height of the CTU is greater than a threshold; the split mode of the CTU is the vertical BT and the width of the CTU is less than or equal to the threshold, and a height of the CTU is greater than the threshold; or the split mode of the CTU is horizontal BT and the height of the CTU is less than or equal to the threshold, and the width of the CTU is greater than the threshold; encoding, by the video encoder, a prediction unit and residual information for the CU into a video bitstream based on the marking; and transmitting, by the video encoder, the video bitstream toward a video decoder.

The method provides techniques that simplify and make more efficient the coding process. By preventing some coding units (CUs) from being predicted using intra prediction under certain conditions, the coder/decoder (a.k.a., "codec") in video coding is improved (e.g., the integrity of the S×S pipeline structure or process is maintained) relative to current codecs. As a practical matter, the improved video coding process offers the user a better user experience when videos are sent, received, and/or viewed.

In a first implementation form of the method according to the first aspect as such, the threshold is 64 luma samples.

In a second implementation form of the method according to the first aspect as such or any preceding implementation form of the first aspect, the threshold is equal to a maximum transform unit (TU) size, and wherein the maximum TU size is 64 luma samples.

In a third implementation form of the method according to the first aspect as such or any preceding implementation form of the first aspect, the threshold is designated S.

In a fourth implementation form of the method according to the first aspect as such or any preceding implementation form of the first aspect, the prediction unit comprises one or more motion vectors when the CU is marked.

In a fifth implementation form of the method according to the first aspect as such or any preceding implementation form of the first aspect, a prediction mode flag is not encoded into the video bitstream when the CU is marked.

In a sixth implementation form of the method according to the first aspect as such or any preceding implementation form of the first aspect, the split mode is one of quad tree (QT), TT, vertical BT, and horizontal BT.

In a seventh implementation form of the method according to the first aspect as such or any preceding implementation form of the first aspect, the CTU is divided into S×S blocks consistent with an S×S block structure.

In an eighth implementation form of the method according to the first aspect as such or any preceding implementation form of the first aspect, the S×S blocks are processed one after another in an S×S pipeline.

A second aspect relates to a method of decoding a video bitstream implemented by a video decoder. The method comprises determining, by the video decoder, a split mode for a coding tree unit (CTU) in an encoded bitstream, wherein the split mode is one of triple tree (TT), vertical binary tree (BT), and horizontal BT; marking, by the video decoder, a coding unit (CU) from the CTU as not to be predicted by intra prediction when: the split mode of the CTU is TT and a width of the CTU or a height of the CTU is greater than a threshold; the split mode of the CTU is the vertical BT and the width of the CTU is less than or equal to the threshold, and a height of the CTU is greater than the threshold; or the split mode of the CTU is horizontal BT and the height of the CTU is less than or equal to the threshold, and the width of the CTU is greater than the threshold; parsing, by the video decoder, the encoded bitstream to obtain a prediction unit and residual information for the CU from the CTU; and reconstructing, by the video decoder, the CU by inter prediction based on the prediction unit and the residual information when the CU has been marked.

The method provides techniques that simplify and make more efficient the coding process. By preventing some coding units (CUs) from being predicted using intra prediction under certain conditions, the coder/decoder (a.k.a., "codec") in video coding is improved (e.g., the integrity of the S×S pipeline structure or process is maintained) relative to current codecs. As a practical matter, the improved video coding process offers the user a better user experience when videos are sent, received, and/or viewed.

In a first implementation form of the method according to the second aspect as such, the threshold is 64 luma samples.

In a second implementation form of the method according to the second aspect as such or any preceding implementation form of the second aspect, the threshold is equal to a maximum transform unit (TU) size, and wherein the maximum TU size is 64 luma samples.

In a third implementation form of the method according to the second aspect as such or any preceding implementation form of the second aspect, the threshold is designated S.

In a fourth implementation form of the method according to the second aspect as such or any preceding implementation form of the second aspect, the prediction unit comprises one or more motion vectors.

In a fifth implementation form of the method according to the second aspect as such or any preceding implementation form of the second aspect, a prediction mode flag is not encoded into the video bitstream when the CU is marked.

In a sixth implementation form of the method according to the second aspect as such or any preceding implementation form of the second aspect, the split mode is one of quad tree (QT), TT, vertical BT, and horizontal BT.

A third aspect relates to an encoding device. The encoding device includes a memory containing instructions; a processor coupled to the memory, the processor configured to implement the instructions to cause the encoding device to split a coding tree unit (CTU) into at least one coding unit (CU) using a split mode, wherein the split mode is one of triple tree (TT), vertical binary tree (BT), and horizontal BT; mark the CU as not to be predicted by intra prediction when: the split mode of the CTU is TT and a width of the CTU or a height of the CTU is greater than a threshold; the split mode of the CTU is the vertical BT and the width of the CTU is less than or equal to the threshold, and a height of the CTU is greater than the threshold; or the split mode of the CTU is horizontal BT and the height of the CTU is less than or equal to the threshold, and the width of the CTU is greater than the threshold; encode a prediction unit and residual information for the CU into a video bitstream based on the marking; and a transmitter coupled to the processor, the transmitter configured to transmit the video bitstream toward a video decoder.

The encoding device provides techniques that simplify and make more efficient the coding process. By preventing some coding units (CUs) from being predicted using intra prediction under certain conditions, the coder/decoder (a.k.a., "codec") in video coding is improved (e.g., the integrity of the S×S pipeline structure or process is maintained) relative to current codecs. As a practical matter, the improved video coding process offers the user a better user experience when videos are sent, received, and/or viewed.

In a first implementation form of the encoding device according to the third aspect as such, the threshold is 64 luma samples.

In a second implementation form of the encoding device according to the third aspect as such or any preceding implementation form of the third aspect, the threshold is equal to a maximum transform unit (TU) size, and wherein the maximum TU size is 64 luma samples.

In a third implementation form of the encoding device according to the third aspect as such or any preceding implementation form of the third aspect, the threshold is designated S.

In a fourth implementation form of the encoding device according to the third aspect as such or any preceding implementation form of the third aspect, the prediction unit comprises one or more motion vectors.

In a fifth implementation form of the encoding device according to the third aspect as such or any preceding implementation form of the third aspect, a prediction mode flag is not encoded into the video bitstream when the CU is marked.

In a sixth implementation form of the encoding device according to the third aspect as such or any preceding implementation form of the third aspect, the split mode is one of quad tree (QT), TT, vertical BT, and horizontal BT.

A fourth aspect relates to a decoding device. The decoding device includes a receiver configured to receive a coded video bitstream; a memory coupled to the receiver, the memory storing instructions; and a processor coupled to the memory, the processor configured to execute the instructions to cause the decoding device to: split a coding tree unit (CTU) into at least one coding unit (CU) using a split mode, wherein the split mode is one of triple tree (TT), vertical binary tree (BT), and horizontal BT; mark the CU as not to be predicted by intra prediction when: the split mode of the CTU is TT and a width of the CTU or a height of the CTU is greater than a threshold; the split mode of the CTU is the vertical BT and the width of the CTU is less than or equal to the threshold, and a height of the CTU is greater than the threshold; or the split mode of the CTU is horizontal BT and the height of the CTU is less than or equal to the threshold, and the width of the CTU is greater than the threshold; encode a prediction unit and residual information for the CU into a video bitstream; and a transmitter coupled to the processor, the transmitter configured to transmit the video bitstream toward a video decoder.

The decoding device provides techniques that simplify and make more efficient the coding process. By preventing some coding units (CUs) from being predicted using intra prediction under certain conditions, the coder/decoder (a.k.a., "codec") in video coding is improved (e.g., the integrity of the S×S pipeline structure or process is maintained) relative to current codecs. As a practical matter, the improved video coding process offers the user a better user experience when videos are sent, received, and/or viewed.

In a first implementation form of the decoding device according to the fourth aspect as such, the threshold is 64.

In a second implementation form of the decoding device according to the fourth aspect as such or any preceding implementation form of the third aspect, the threshold is equal to a maximum transform unit (TU) size, and wherein the maximum TU size is 64.

In a third implementation form of the decoding device according to the fourth aspect as such or any preceding implementation form of the third aspect, the threshold is designated S.

In a fourth implementation form of the decoding device according to the fourth aspect as such or any preceding implementation form of the third aspect, the prediction unit comprises one or more motion vectors.

In a fifth implementation form of the decoding device according to the fourth aspect as such or any preceding implementation form of the third aspect, a prediction mode flag is not encoded into the video bitstream when the CU is marked.

In a sixth implementation form of the decoding device according to the fourth aspect as such or any preceding implementation form of the third aspect, the split mode is one of quad tree (QT), TT, vertical BT, and horizontal BT.

In a seventh implementation form of the decoding device according to the fourth aspect as such or any preceding implementation form of the third aspect, the CTU is divided into S×S blocks consistent with an S×S block structure.

In an eighth implementation form of the decoding device according to the fourth aspect as such, the decoding device further comprises a display configured to display an image generated using the prediction unit and the residual information.

A fifth aspect relates to a coding apparatus. The coding apparatus includes a receiver configured to receive a bitstream to decode; a transmitter coupled to the receiver, the transmitter configured to transmit a decoded image to a display; a memory coupled to at least one of the receiver or the transmitter, the memory configured to store instructions; and a processor coupled to the memory, the processor configured to execute the instructions stored in the memory to perform the methods described herein.

The coding apparatus provides techniques that simplify and make more efficient the coding process. By preventing some coding units (CUs) from being predicted using intra prediction under certain conditions, the coder/decoder (a.k.a., "codec") in video coding is improved (e.g., the integrity of the S×S pipeline structure or process is maintained) relative to current codecs. As a practical matter, the improved video coding process offers the user a better user experience when videos are sent, received, and/or viewed.

A sixth aspect relates to a system. The system includes an encoder; and a decoder in communication with the encoder, wherein the encoder or the decoder includes the decoding device, the encoding device, or the coding apparatus disclosed herein.

The system provides techniques that that simplify and make more efficient the coding process. By preventing some coding units (CUs) from being predicted using intra prediction under certain conditions, the coder/decoder (a.k.a., "codec") in video coding is improved (e.g., the integrity of the S×S pipeline structure or process is maintained) relative to current codecs. As a practical matter, the improved video coding process offers the user a better user experience when videos are sent, received, and/or viewed.

A seventh aspect relates to a means for coding. The means for coding includes receiving means configured to receive a bitstream to decode; transmission means coupled to the receiving means, the transmission means configured to transmit a decoded image to a display means; storage means coupled to at least one of the receiving means or the transmission means, the storage means configured to store instructions; and processing means coupled to the storage means, the processing means configured to execute the instructions stored in the storage means to perform the methods disclosed herein.

The means for coding provides techniques that simplify and make more efficient the coding process. By preventing some coding units (CUs) from being predicted using intra prediction under certain conditions, the coder/decoder (a.k.a., "codec") in video coding is improved (e.g., the integrity of the S×S pipeline structure or process is maintained) relative to current codecs. As a practical matter, the improved video coding process offers the user a better user experience when videos are sent, received, and/or viewed.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 5A-C collectively illustrate an example of a partitioning pattern corresponding to an S×S pipeline structure.

DETAILED DESCRIPTION

Figure 1:
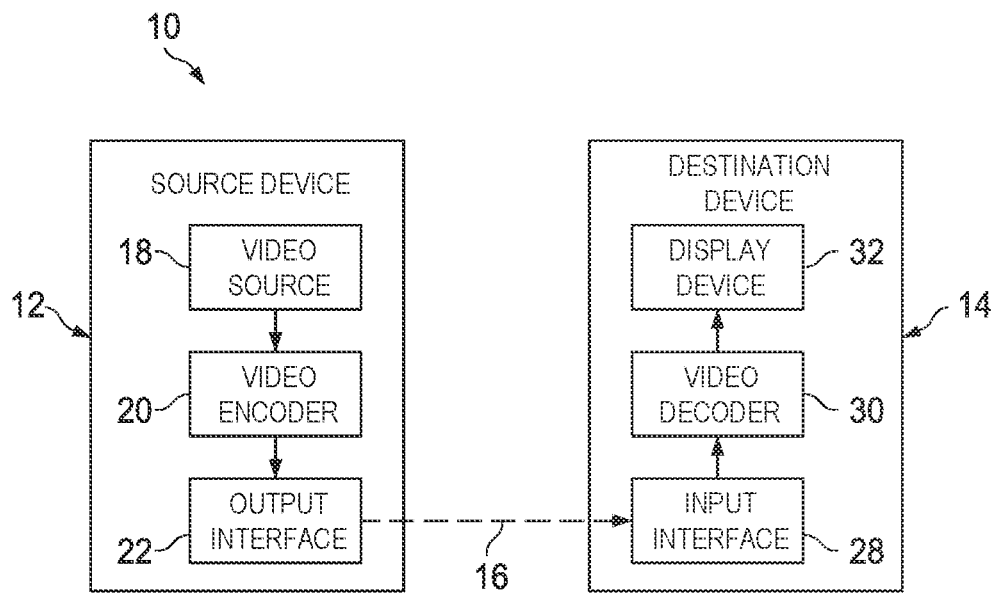
FIG. 1 is a block diagram illustrating an example coding system that may utilize bi-lateral prediction techniques.

FIG. 1 is a block diagram illustrating an example coding system 10 that may utilize video coding techniques as described herein. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of the source device 12 and/or the video decoder 30 of the destination device 14 may be configured to apply the techniques for video coding. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for video coding may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Moving Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
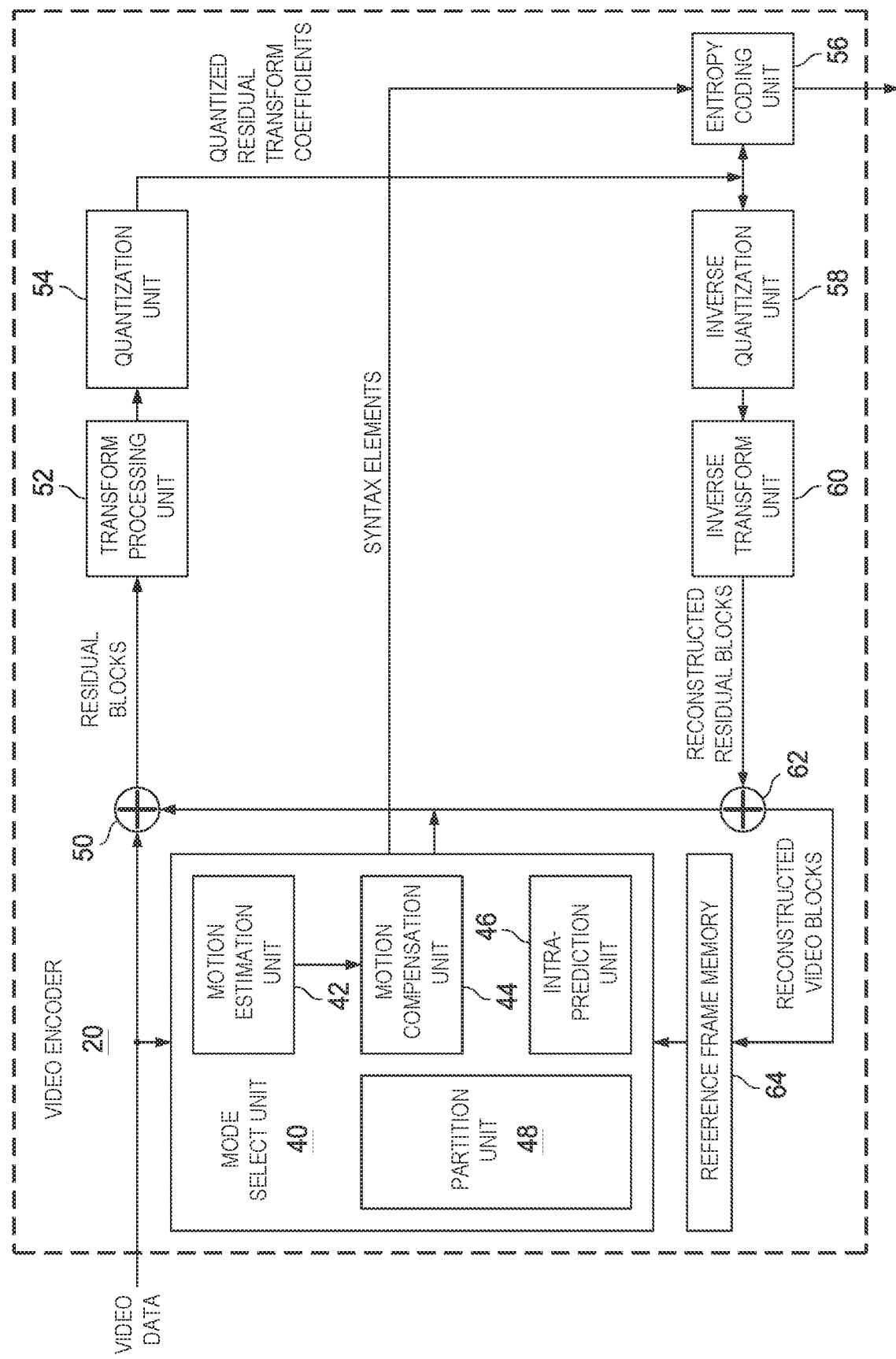
FIG. 2 is a block diagram illustrating an example video encoder that may implement bi-lateral prediction techniques.

FIG. 2 is a block diagram illustrating an example of video encoder 20 that may implement video coding techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional (a.k.a., uni prediction) prediction (P mode) or bi-prediction (a.k.a., bi prediction) (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction (a.k.a., intra prediction) unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quad-tree data structure indicative of partitioning of a LCU into sub-CUs. Leaf-node CUs of the quad-tree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction (a.k.a., inter prediction) mode encoded. PUs may be partitioned to be non-square in shape. Syntax data associated with a CU may also describe, for example, partitioning of the CU into one or more TUs according to a quad-tree. A TU can be square or non-square (e.g., rectangular) in shape.

Mode select unit 40 may select one of the coding modes, intra- or inter-, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
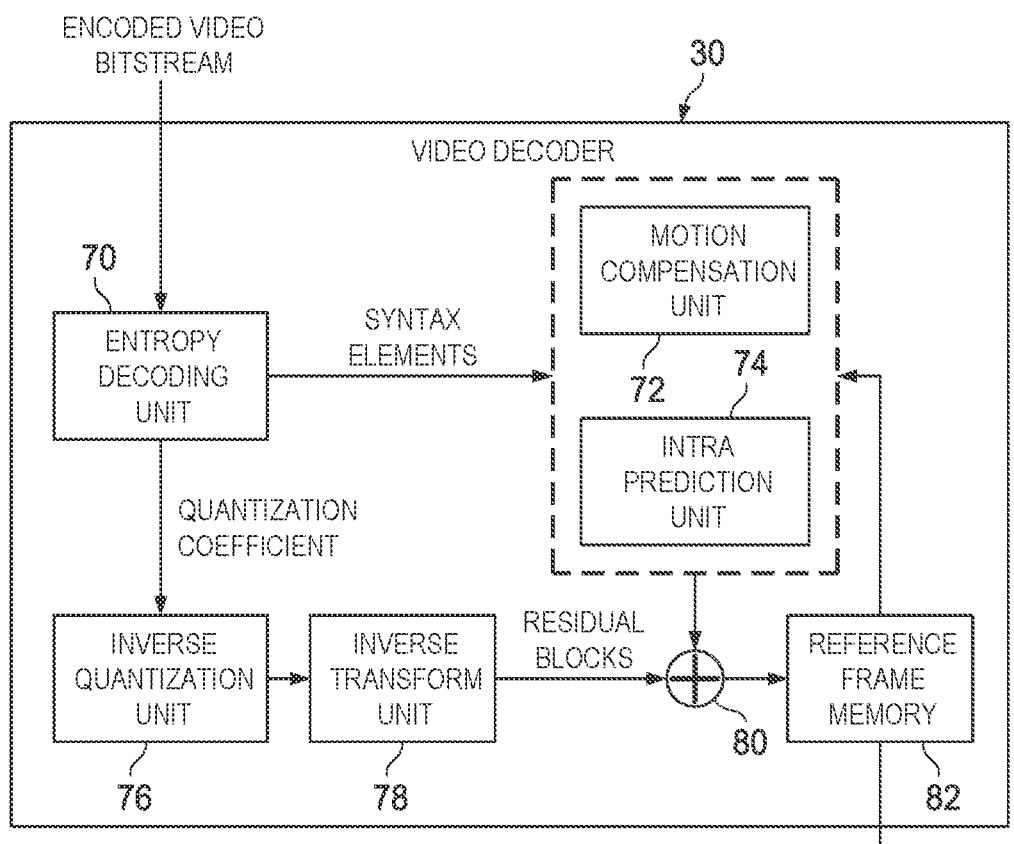
FIG. 3 is a block diagram illustrating an example of a video decoder that may implement bi-lateral prediction techniques.

FIG. 3 is a block diagram illustrating an example of video decoder 30 that may implement video coding techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of the video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

Image and video compression has experienced rapid growth, leading to various coding standards. Such video coding standards include ITU-T H.261, ISO/IEC MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC). There is also a new video coding standard, named Versatile Video Coding (VVC), being developed by the joint video experts team (JVET) of ITU-T and ISO/IEC. The latest Working Draft (WD) of VVC included in JVET-L1001-v1.

When performing video coding, video is separated into frames. The frames are partitioned into blocks of pixels. Each pixel block, which may be referred to as a coding tree unit (CTU) or an image block, is then compressed by intra-prediction and/or inter-prediction. Intra-prediction matches each image block to one or more reference samples in the frame. An intra-prediction mode is then encoded to indicate a relationship between the image block and the reference sample(s). The encoded intra-prediction mode takes up less space than the image pixels. Inter-prediction operates in a similar manner for image blocks matched between frames.

Partitioning systems are configured to split image blocks into sub-blocks. For example, a tree structure employing various split modes can be employed to split a node (e.g., a block) into child nodes (e.g., sub-blocks). Different split modes can be employed to obtain different partitions. Further, split modes can also be applied recursively to further subdivide nodes.

Figures 4A, 4B, 4C, 4D, 4E:
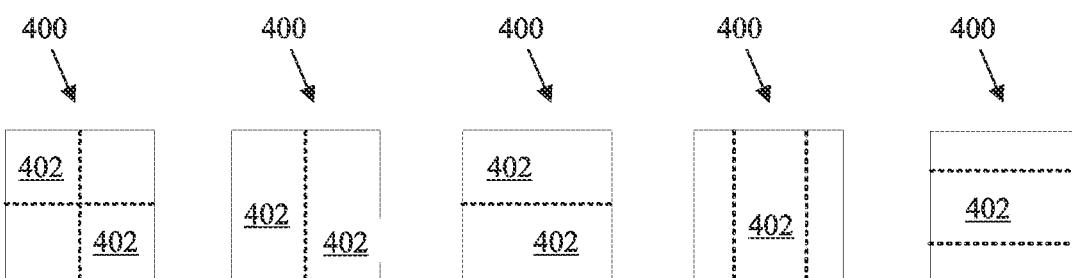
FIGS. 4A-E collectively illustrate a block subjected to one of the various partitioning types.

FIGS. 4A-E collectively illustrate a block 400 (e.g., a CTU) subjected to one of the various partitioning types. The block 400 in FIG. 4A has been quad-tree (QT) partitioned (a.k.a., split) into four sub-blocks 402. The blocks 400 in FIGS. 4B-C have been binary-tree (BT) partitioned into two sub-blocks 402. For binary-tree splitting, there are two splitting types. FIG. 4B illustrates vertical binary-tree partitioning and FIG. 4C illustrates horizontal binary-tree partitioning. Tree types other than quad-tree and binary-tree are supported. For example, vertical center-side triple-tree (TT) partitioning is shown in FIG. 4D, and horizontal center-side TT partitioning is shown in FIG. 4E. TT partitioning may also be referred to as ternary-tree partitioning or center-side TT partitioning. In FIGS. 4D-4E, the blocks 400 are split into three of the sub-blocks 402. The partitioning process may be iterated to split the blocks 400 until the minimum allowed quad-tree leaf node size is reached.

The QT-BTTT coding structure described above may be used to partition a root node into a plurality of leaf nodes. First, the root node may be partitioned by only quad-tree partitioning into one or more quad-tree leaf nodes, and the quad-tree leaf nodes may be further split using either binary-tree partitioning or triple-tree partitioning into leaf nodes of the coding tree. This coding tree structure is described in document JVET-D0117.

FIGS. 5A-5D collectively illustrate an example of a partitioning pattern 500 corresponding to an S×S pipeline structure. As shown in FIG. 5A, a block 504 (e.g., a CTU) is initially split into sub-blocks 506 and 508 using a vertical BT partitioning. Next, as shown in FIG. 5B, the sub-block 506 in block 504 has been further split into sub-blocks 512 and 514 using a vertical BT partitioning. In the illustrated example, sub-block 512 represents a first coding unit (CU1), sub-block 514 represents a second coding unit (CU2), and sub-block 508 represents a third coding unit (CU3).

As shown in FIG. 5C, transform units (e.g., TU0-TU5) have been applied to the sub-blocks 508, 512, and 514 of FIG. 5B. A horizontal dashed line has been added to the block 504 to represent the boundary between the TUs. The block 504 in FIG. 5C comprises four S×S blocks 518, which may be identified by referencing the different TUs. For example, a top left S×S block 518 contains TU0 and TU2, a top right S×S block 518 contains TU4, a bottom left S×S block 518 contains TU1 and TU3, and a bottom right S×S block 518 contains TU5. In the illustrated example, the size of block 504 is 128×128, the size of each S×S block 518 is 64×64, the size of CU1 and CU2 is 32×128, the size of CU3 is 64×128, the size of TU0-TU3 is 32×64, and the size of TU4 and TU5 is 64×64. Those skilled in the art will appreciate that other splits and dimensions may be used in practical applications. For reference, the height of the block 504 is labeled H in FIG. 5C, and the width of the block 504 is labeled W in FIG. 5C.

In a hardware video codec pipeline design, blocks 504 are often arranged in an S×S block based pipeline, where S may be equal to a maximum TU size allowed by a standard, e.g., S=64 for VVC draft 1. In an embodiment, the threshold is 64 luma samples. During coding, the S×S blocks 518 are processed one after another.

For some blocks 504 (e.g., coding tree nodes), a binary split or a ternary split may hamper the S×S pipeline block structure. By way of example, TU0 and TU1 in CU1 span over two S×S blocks 518, namely the top left S×S block 518 (which contains TU0 and TU2) and the bottom left S×S block 518 (which contains TU1 and TU3). Because TU0 does not fully cover the top left S×S block 518, the top left S×S block 518 also contains TU2 from CU2. However, when TU2 is intra predicted, the reference pixels for TU2 are partially inside TU1. Because TU1 is inside a different S×S block 518 relative to TU2, the reference pixels in TU1 have not been reconstructed under the S×S pipeline structure. This breaks the S×S pipeline structure.

Disclosed herein are video coding techniques that preserve the S×S pipeline structure. That is, the techniques solve the intra-prediction reference sample dependency problem under the S×S pipeline block structure. The embodiments disclosed herein prevent or constrain CUs from being intra predicted under certain conditions, which are described in further detail below. By preventing some CUs from being intra predicted under these conditions, the coder/decoder (a.k.a., "codec") in video coding is improved (e.g., the integrity of the S×S pipeline structure or process is maintained) relative to current codecs. As a practical matter, the improved video coding process offers the user a better user experience when videos are sent, received, and/or viewed.

In an embodiment, the quad tree multi-tree type (QT-MTT) coding tree structure of VVC draft 1 is used. The maximum CTU size is 128×128, and the maximum allowed TU size is 64×64. The maximum BT Size, denoted as maxBTSize, can be set up to 128. When one side (width or height) of a node (e.g., block 504) is greater than maxBTSize, the node is not allowed to use binary tree (BT) split. The maximum TT size, denoted as maxTTSize, can be set up to 128. When one side of a node is greater than maxTT Size, the node is not allowed to use triple tree (TT) split.

In such an embodiment, the coding units contained in the current coding tree node are not allowed to use intra prediction when one of the following three conditions, namely Conditions 1 to 3 described below, is true or met. The coding units contained in the current coding tree node are the child leaf nodes of the current coding tree node.

Condition 1: the current coding tree node (e.g., block 504) is split by a ternary split, and the width or height of the current coding tree node is larger than a threshold S (i.e., S=64).

Condition 2: the current coding tree node is split by a vertical binary split, and the width of the current coding tree node is smaller than or equal to S, and the height of the current coding tree node is greater than S.

Condition 3: the current coding tree node is split by a horizontal binary split, and the height of the current coding tree node is smaller than or equal to S, and the width of the current coding tree node is greater than S.

Whether a coding unit uses intra prediction mode or inter prediction mode may be signaled by a flag, such as the pred_mode_flag in HEVC or VVC draft 1. The prediction mode of a coding unit is inter prediction mode (or intra prediction mode) if pred_mode_flag is equal to 0 (or 1).

When a coding unit is not allowed to use intra prediction, the pred_mode_flag does not need to be explicitly signaled. When parsing the coding unit syntax structure of such a coding unit, the pred_mode_flag is not present in the bitstream and is implicitly determined as 0.

Figure 6:
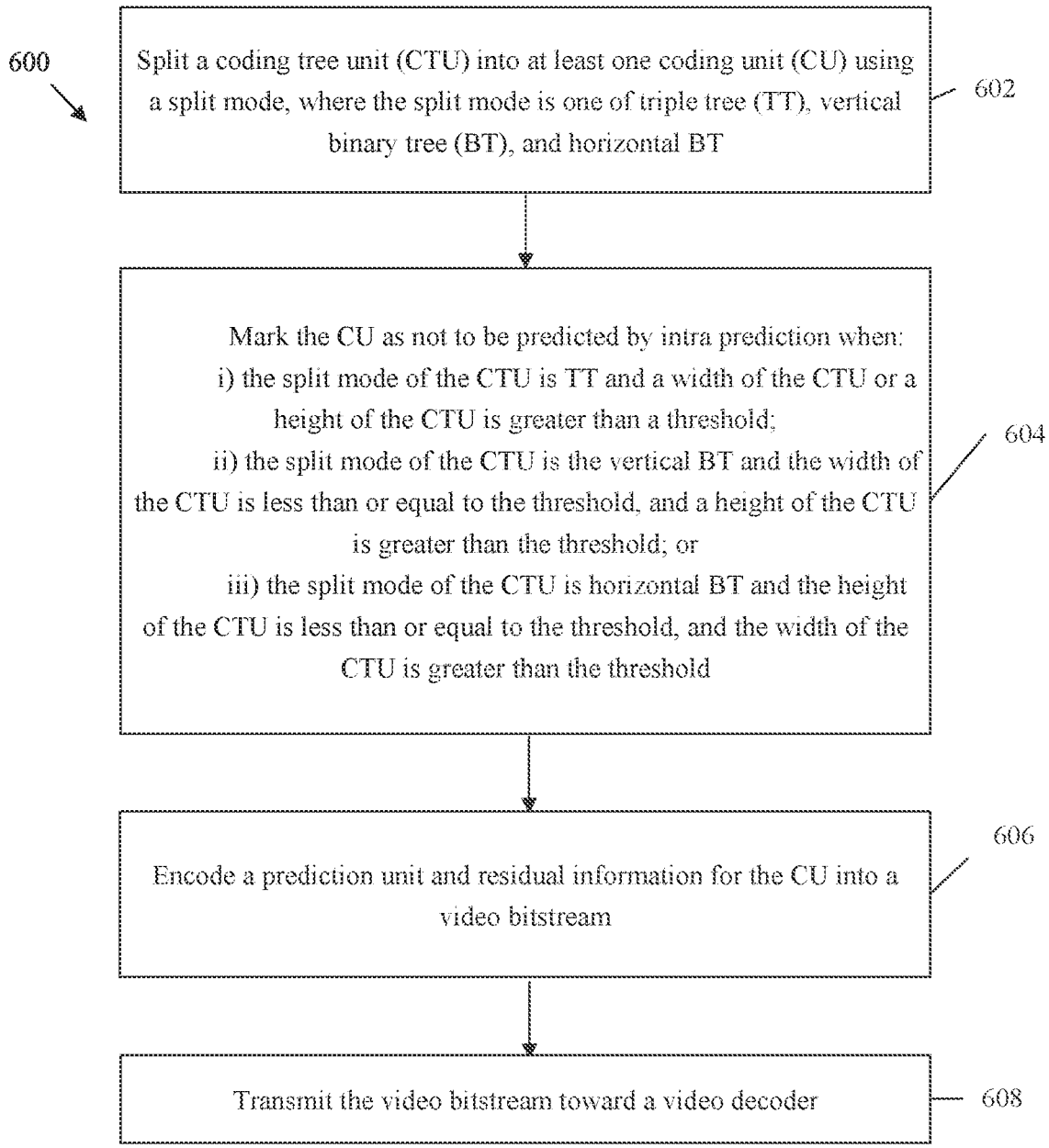
FIG. 6 is an embodiment of a method of encoding a video bitstream.

FIG. 6 is an embodiment of a method 600 of encoding a video bitstream implemented by a video encoder (e.g., video encoder 20). The method 600 may be performed when a picture (e.g., from a video) is to be encoded into a video bitstream and then transmitted toward a video decoder (e.g., video decoder 30). The method 600 improves the encoding process because the integrity of the S×S pipeline structure or process is maintained. Therefore, as a practical matter, the performance of a codec is improved, which leads to a better user experience.

In block 602, the video encoder splits a CTU (e.g., block 504) into at least one CU (e.g., CU1, CU2, CU3) using a split mode. A CTU is a largest set of sample values that can be coded by prediction. A CTU can be portioned into one or more CUs prior to coding by employing a coding tree. A split mode is a mechanism for dividing a parent node in a CTU into child/leaf nodes. Split modes are recursively applied according to a coding tree to partition a root node of a CTU into child/leaf nodes that contain the CUs. The split mode may be, for example, QT, vertical BT, horizontal BT, vertical TT, or horizontal TT as, for example, illustrated in FIGS. 4A-4E.

In block 604, the video encoder marks the CU as not to be predicted by intra prediction when any of the following conditions occur or are met: the split mode of the CTU is TT and a width of the CTU or a height of the CTU is greater than a threshold; the split mode of the CTU is the vertical BT and the width of the CTU is less than or equal to the threshold, and a height of the CTU is greater than the threshold; or the split mode of the CTU is horizontal BT and the height of the CTU is less than or equal to the threshold, and the width of the CTU is greater than the threshold.

In an embodiment, the threshold is 64. In an embodiment, the threshold is equal to a maximum TU size (e.g., a maximum TU size of 64). The threshold may be designated S in correspondence with the S×S block 518 and the S×S pipeline structure or process.

In block 606, the video encoder encodes a prediction unit (PU) and residual information (a.k.a., residuals) for the CU into a video bitstream. A PU is data that codes a current block by reference to a reference block. A PU can contain MVs when employed for inter prediction and intra modes when employed for intra prediction. In an embodiment, the PU comprises one or more motion vectors. In an embodiment, a prediction mode flag is not encoded into the video bitstream when the CU is marked. In an embodiment, the S×S blocks (e.g., blocks 518) in the CTU 504 are processed one after another in an S×S pipeline.

In block 608, the video encoder transmits the video bitstream toward a video decoder (e.g., video decoder 30). The video bitstream may also be referred to as a coded video bitstream or an encoded video bitstream. Once received by the video decoder, the encoded video bitstream may be decoded (e.g., as described below) to generate or produce an image for display to a user on the display or screen of an electronic device (e.g., a smart phone, tablet, laptop, personal computer, etc.).

Figure 7:
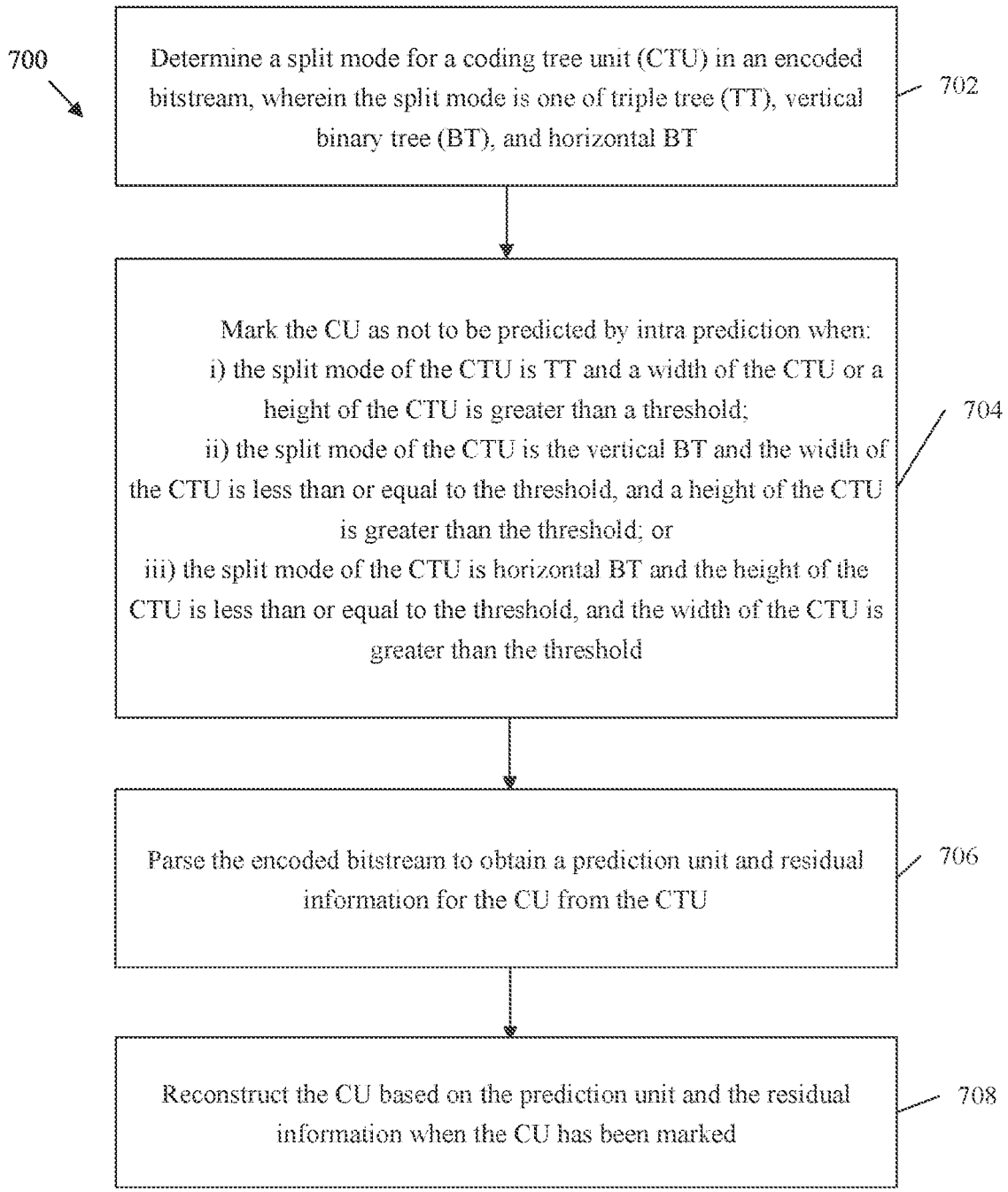
FIG. 7 is an embodiment of a method of decoding a coded video bitstream.

FIG. 7 is an embodiment of a method 700 of decoding a coded video bitstream implemented by a video decoder (e.g., video decoder 30). The method 700 may be performed after the decoded bitstream has been directly or indirectly received from a video encoder (e.g., video encoder 20). The method 700 improves the decoding process because the integrity of the S×S pipeline structure or process is maintained. Therefore, as a practical matter, the performance of a codec is improved, which leads to a better user experience.

In block 702, the video decoder determines a split mode for a CTU in an encoded bitstream. The split mode may be, for example, QT, vertical BT, horizontal BT, vertical TT, or horizontal TT as, for example, illustrated in FIGS. 4A-4E.

In block 704, the video decoder marks the CU as not to be predicted by intra prediction when any of the following conditions occur or are met: the split mode of the CTU is TT and a width of the CTU or a height of the CTU is greater than a threshold; the split mode of the CTU is the vertical BT and the width of the CTU is less than or equal to the threshold, and a height of the CTU is greater than the threshold; or the split mode of the CTU is horizontal BT and the height of the CTU is less than or equal to the threshold, and the width of the CTU is greater than the threshold.

In an embodiment, the threshold is 64. In an embodiment, the threshold is equal to a maximum TU size (e.g., a maximum TU size of 64). The threshold may be designated S in correspondence with the S×S block 518 and the S×S pipeline structure or process.

In block 706, the video decoder parses the encoded bitstream to obtain a prediction unit and residual information for the CU from the CTU. In an embodiment, the PU comprises one or more motion vectors. In an embodiment, a prediction mode flag is not encoded into the video bitstream when the CU is marked. In an embodiment, the S×S blocks (e.g., blocks 518) in the CTU 504 are processed one after another in an S×S pipeline.

In block 708, the video decoder reconstructs the CU based on the prediction unit and the residual information when the CU has been marked. In an embodiment, the reconstructed CU may be used to generate or produce an image for display to a user on the display or screen of an electronic device (e.g., a smart phone, tablet, laptop, personal computer, etc.).

Figure 8:
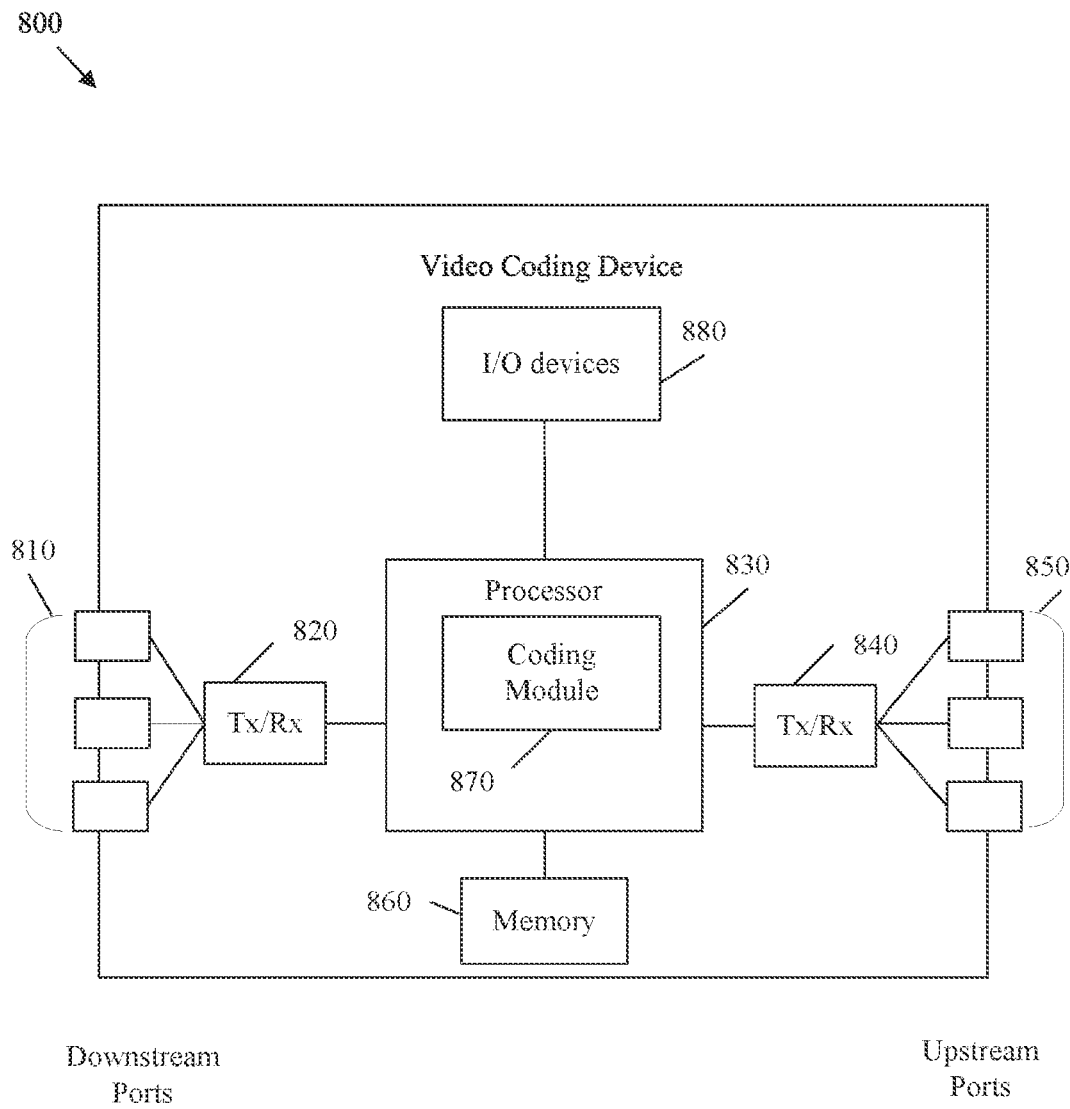
FIG. 8 is a schematic diagram of a video coding device.

FIG. 8 is a schematic diagram of a video coding device 800 (e.g., a video encoder 20 or a video decoder 30) according to an embodiment of the disclosure. The video coding device 800 is suitable for implementing the disclosed embodiments as described herein. The video coding device 800 comprises ingress ports 810 and receiver units (Rx) 820 for receiving data; a processor, logic unit, or central processing unit (CPU) 830 to process the data; transmitter units (Tx) 840 and egress ports 850 for transmitting the data; and a memory 860 for storing the data. The video coding device 800 may also comprise optical-to-electrical (OE) components and electrical-to-optical (EO) components coupled to the ingress ports 810, the receiver units 820, the transmitter units 840, and the egress ports 850 for egress or ingress of optical or electrical signals.

The processor 830 is implemented by hardware and software. The processor 830 may be implemented as one or more CPU chips, cores (e.g., as a multi-core processor), field-programmable gate arrays (FPGAs), application specific integrated circuits (ASICs), and digital signal processors (DSPs). The processor 830 is in communication with the ingress ports 810, receiver units 820, transmitter units 840, egress ports 850, and memory 860. The processor 830 comprises a coding module 870. The coding module 870 implements the disclosed embodiments described above. For instance, the coding module 870 implements, processes, prepares, or provides the various networking functions. The inclusion of the coding module 870 therefore provides a substantial improvement to the functionality of the video coding device 800 and effects a transformation of the video coding device 800 to a different state. Alternatively, the coding module 870 is implemented as instructions stored in the memory 860 and executed by the processor 830.

The video coding device 800 may also include input and/or output (I/O) devices 880 for communicating data to and from a user. The I/O devices 880 may include output devices such as a display for displaying video data, speakers for outputting audio data, etc. The I/O devices 880 may also include input devices, such as a keyboard, mouse, trackball, etc., and/or corresponding interfaces for interacting with such output devices.

The memory 860 comprises one or more disks, tape drives, and solid-state drives and may be used as an overflow data storage device, to store programs when such programs are selected for execution, and to store instructions and data that are read during program execution. The memory 860 may be volatile and/or non-volatile and may be read-only memory (ROM), random access memory (RAM), ternary content-addressable memory (TCAM), and/or static random-access memory (SRAM).

Figure 9:
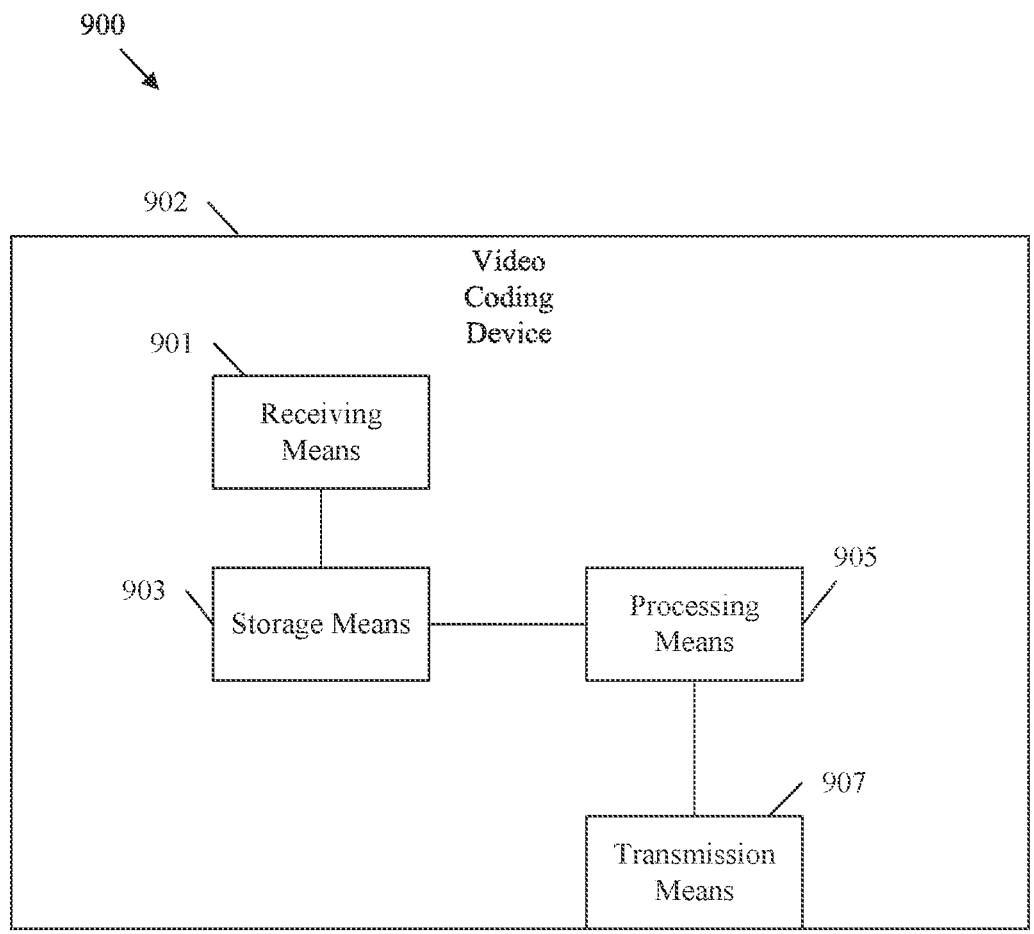
FIG. 9 is a schematic diagram of an embodiment of a means for coding.

FIG. 9 is a schematic diagram of an embodiment of a means for coding 900. In embodiment, the means for coding 900 is implemented in a video coding device 902 (e.g., a video encoder 20 or a video decoder 30). The video coding device 902 includes receiving means 901. The receiving means 901 is configured to receive a picture to encode or to receive a bitstream to decode. The video coding device 902 includes transmission means 907 coupled to the receiving means 901. The transmission means 907 is configured to transmit the bitstream to a decoder or to transmit a decoded image to a display means (e.g., one of the I/O devices 880).

The video coding device 902 includes a storage means 903. The storage means 903 is coupled to at least one of the receiving means 901 or the transmission means 907. The storage means 903 is configured to store instructions. The video coding device 902 also includes processing means 905. The processing means 905 is coupled to the storage means 903. The processing means 905 is configured to execute the instructions stored in the storage means 903 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An encoding method, comprising:
   splitting a coding tree node into at least one coding node (CU) according to a split mode, wherein the split mode is one of quad tree (QT) split, triple tree (TT) split, or binary tree (BT) split, and wherein the TT split comprises vertical TT and horizontal TT, and the BT split comprises vertical BT and horizontal BT;
   determining that the coding tree node is not allowed to use the BT split when a width or a height of the coding tree node is greater than a maximum BT Size (maxBTSize);
   encoding a syntax element related to the split mode into a bitstream;
   determining the CU is not allowed to be predicted by intra prediction when:
      the split mode of the coding tree node is the TT split and the width of the coding tree node or the height of the coding tree node is greater than a threshold;
      the split mode of the coding tree node is the vertical BT and the width of the coding tree node is less than or equal to the threshold, and the height of the coding tree node is greater than the threshold; or
      the split mode of the coding tree node is the horizontal BT and the height of the coding tree node is less than or equal to the threshold, and the width of the coding tree node is greater than the threshold; and
   determining that a prediction mode flag is not encoded into the bitstream when the CU is not allowed to be predicted by intra prediction.

2. The method of claim 1, wherein the prediction mode flag is pred_mode_flag.

3. The method of claim 1, wherein when the prediction mode flag is not present in the bitstream, the prediction mode flag is determined to be 0.

4. The method of claim 1, wherein a prediction unit of the CU comprises one or more motion vectors.

5. A decoding method, comprising:
   determining a split mode for a coding tree node from a bitstream, wherein the split mode is one of quad tree (QT) split, triple tree (TT) split, or binary tree (BT) split, and wherein the TT split comprises vertical TT and horizontal TT, and the BT split comprises vertical BT and horizontal BT;
   determining that the coding tree node is not allowed to use the BT split when a width or a height of the coding tree node is greater than a maximum BT Size (maxBTSize);
   determining a syntax element related to the split mode from the bitstream;
   determining a coding unit (CU) from the coding tree node is not allowed to be predicted by intra prediction when:
      the split mode of the coding tree node is the TT split and the width of the coding tree node or the height of the coding tree node is greater than a threshold;
      the split mode of the coding tree node is the vertical BT and the width of the coding tree node is less than or equal to the threshold, and the height of the coding tree node is greater than the threshold; or
      the split mode of the coding tree node is the horizontal BT and the height of the coding tree node is less than or equal to the threshold, and the width of the coding tree node is greater than the threshold; and
   determining that a prediction mode flag is not encoded into the bitstream when the CU is not allowed to be predicted by intra prediction.

6. The method of claim 5, wherein the prediction mode flag is pred_mode_flag.

7. The method of claim 5, wherein when the prediction mode flag is not present in the bitstream, the prediction mode flag is determined to be 0.

8. The method of claim 5, wherein a prediction unit of the CU comprises one or more motion vectors.

9. An encoding device, comprising:
   a memory containing instructions;
   one or more processors coupled to the memory, the one or more processors configured to implement the instructions to cause the encoding device to:
      split a coding tree node into at least one coding node (CU) according to a split mode, wherein the split mode is one of quad tree (QT) split, triple tree (TT) split, or binary tree (BT) split, and wherein the TT split comprises vertical TT and horizontal TT, and the BT split comprises vertical BT and horizontal BT;
      determine that the coding tree node is not allowed to use the BT split when a width or a height of the coding tree node is greater than a maximum BT Size (maxBTSize);
      encode a syntax element related to the split mode into a bitstream;
      determine the CU is not allowed to be predicted by intra prediction when:
         the split mode of the coding tree node is the TT split and the width of the coding tree node or the height of the coding tree node is greater than a threshold;
         the split mode of the coding tree node is the vertical BT and the width of the coding tree node is less than or equal to the threshold, and the height of the coding tree node is greater than the threshold; or
         the split mode of the coding tree node is the horizontal BT and the height of the coding tree node is less than or equal to the threshold, and the width of the coding tree node is greater than the threshold; and
      determine that a prediction mode flag is not encoded into the bitstream when the CU is not allowed to be predicted by intra prediction.

10. The encoding device of claim 9, wherein the prediction mode flag is pred_mode_flag.

11. The encoding device of claim 9, wherein when the prediction mode flag is not present in the bitstream, the prediction mode flag is determined to be 0.

12. The encoding device of claim 9, wherein a prediction unit of the CU comprises one or more motion vectors.

13. A decoding device, comprising:
a receiver configured to receive a bitstream;
a memory coupled to the receiver, the memory storing instructions; and
one or more processors coupled to the memory, the one or more processors configured to execute the instructions to cause the decoding device to:
determine a split mode for a coding tree node from the bitstream, wherein the split mode is one of quad tree (QT) split, triple tree (TT) split, or binary tree (BT) split, and wherein the TT split comprises vertical TT and horizontal TT, and the BT split comprises vertical BT and horizontal BT;
determine that the coding tree node is not allowed to use the BT split when a width or a height of the coding tree node is greater than a maximum BT Size (maxBTSize);
determine a syntax element related to the split mode from the bitstream;
determine a coding unit (CU) from the coding tree node is not allowed to be predicted by intra prediction when:
the split mode of the coding tree node is the TT split and the width of the coding tree node or the height of the coding tree node is greater than a threshold;
the split mode of the coding tree node is the vertical BT and the width of the coding tree node is less than or equal to the threshold, and the height of the coding tree node is greater than the threshold; or
the split mode of the coding tree node is the horizontal BT and the height of the coding tree node is less than or equal to the threshold, and the width of the coding tree node is greater than the threshold; and
determine that a prediction mode flag is not encoded into the bitstream when the CU is not allowed to be predicted by intra prediction.

14. The decoding device of claim 13, wherein the prediction mode flag is pred_mode_flag.

15. The decoding device of claim 13, wherein when the prediction mode flag is not present in the bitstream, the prediction mode flag is determined to be 0.

16. The decoding device of claim 13, wherein a prediction unit of the CU comprises one or more motion vectors.

\* \* \* \* \*